United States Patent [19]

Martinmaas

[11] 4,386,879

[45] Jun. 7, 1983

[54] OPERATING MEANS FOR A CHUCK

[76] Inventor: Werner W. Martinmaas, 3461 Cashill Blvd., Reno, Nev. 89509

[21] Appl. No.: 255,674

[22] Filed: Apr. 20, 1981

[51] Int. Cl.³ .............................................. B23B 45/00

[52] U.S. Cl. ................................ 408/241 R; 408/240; 279/1 K; 279/62; 81/90 A

[58] Field of Search ............... 408/241 R, 239 R, 197, 408/240; 279/1 K, 56, 60, 61, 62, 63, 64, 65; 81/90 A

[56] References Cited

U.S. PATENT DOCUMENTS

| | | | |
|---|---|---|---|
| 2,807,732 | 9/1957 | Kurtovich | 310/50 |
| 3,174,365 | 3/1965 | Lucarelli | 77/55 |
| 3,728,038 | 4/1973 | Gage | 408/241 |
| 4,324,512 | 4/1982 | Siroky | 408/241 R |

*Primary Examiner*—Robert E. Garrett
*Assistant Examiner*—Hien Phan
*Attorney, Agent, or Firm*—Wood, Dalton, Phillips, Mason & Rowe

[57] ABSTRACT

An operator for a Jacobs chuck has an annular support pivoted on the chuck collar for rocking movement about an axis perpendicular to the chuck axis, a gear tooth on the support between the pivot axis and the chuck ring gear which is selectively engageable with the ring gear teeth so that rocking the support causes the gear tooth to rotate the ring gear, and means permitting manual movement of the gear tooth into and out of engagement with the ring gear teeth. The annular support is counterbalanced so its center of mass is on the chuck axis, and a stabilizer normally maintains the support in a plane perpendicular to said axis.

17 Claims, 13 Drawing Figures

Fig. 6.
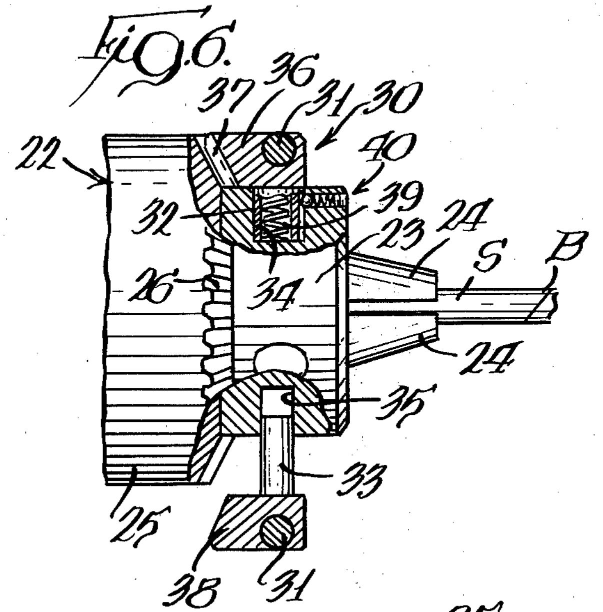
Fig. 7.
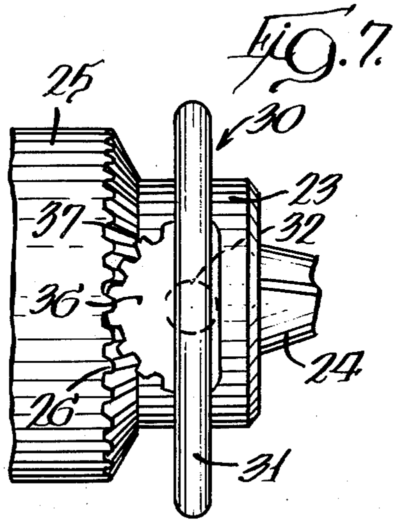
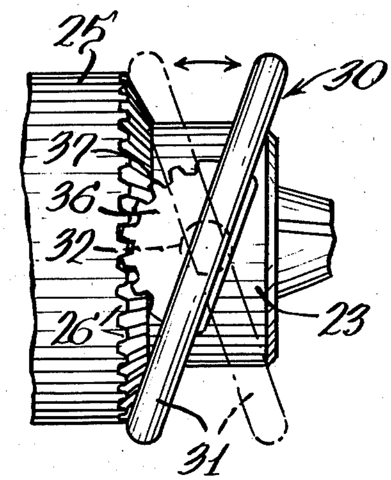
Fig. 8.
Fig. 9.
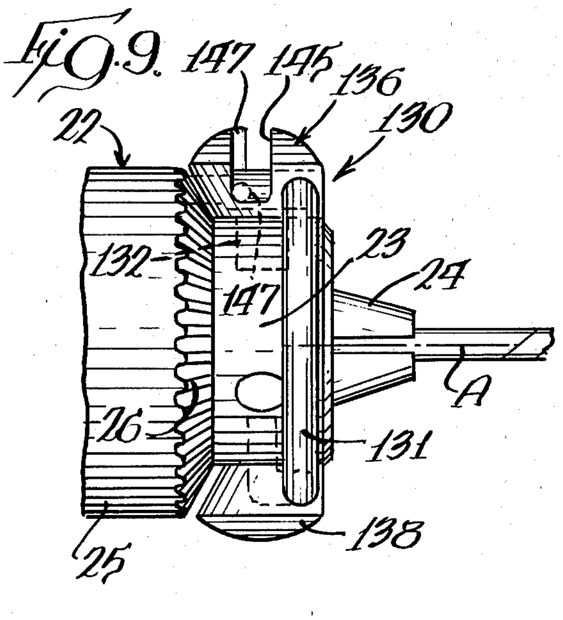
Fig. 10.
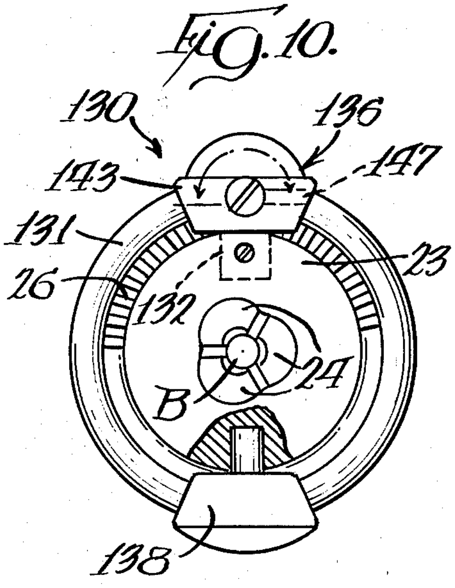

OPERATING MEANS FOR A CHUCK

BACKGROUND OF THE INVENTION

Many small machine tools, hand tools and portable power tools use the well-known Jacobs chuck to clamp a tool spindle in the tool. The key of a Jacobs chuck is often lost between uses of the tool because few such tools have a satisfactory means for storing the key.

One type of solution to the problem has been to provide means to mount the key on the hand tool or on the power cord close to the hand tool. Holloway U.S. Pat. No. 1,821,436 shows such a solution to the problem. It has also been known to provide a rubber "bracket" which fastens onto the power cord and has jaws which frictionally grip the shank of the chuck key. The difficulty with such devices is that the person using the hand tool must still remember to put the chuck key back where it belongs.

Another type of solution to the chuck key problem is to provide means for permanently mounting the chuck key on the hand tool in such a way that it may be selectively engaged and disengaged with the ring gear of the chuck. The only such arrangements known to applicant are disclosed in Kurtovich U.S. Pat. No. 2,807,732, Lucarelli U.S. Pat. No. 3,174,365, and Gage U.S. Pat. No. 3,728,038. These patents eliminate the lost key problem, but require either a complete redesign of the tool housing, as in Kurtovich; or store the key in a location where it may interfere with use of the tool as in Lucarelli and Gage.

SUMMARY OF THE INVENTION

The principal object of the present invention is to provide an improved chuck operator for a Jacobs chuck which is permanently mounted upon the chuck, which is so compact and of such a structure that it causes no interference with the use of a hand tool, and which requires no modification of the chuck except for drilling one extra hole in the chuck collar which carries the movable tool gripping elements and the rotatable ring gear of the chuck.

The object of the present invention is met by providing ring gear engaging means which is permanently supported on the chuck collar and movable on the collar to rotate the ring gear selectively in a forward or reverse direction, together with means permitting manual movement of the engaging means into and out of engagement with the ring gear teeth.

THE DRAWINGS

FIG. 6 is a side elevational view, partly in section as indicated along the line 6—6 of FIG. 5;

FIG. 7 is a plan view with the chuck operating means in the position of FIG. 5;

FIG. 8 is a view similar to FIG. 7, illustrating the chuck operating means in full line in one extreme position and in broken lines in the other extreme position;

FIG. 9 is a side elevational view of an alternative embodiment of the invention;

FIG. 10 is a front elevational view, partly in section, of the alternative embodiment;

DETAILED DESCRIPTION OF THE INVENTION

Figure 1:
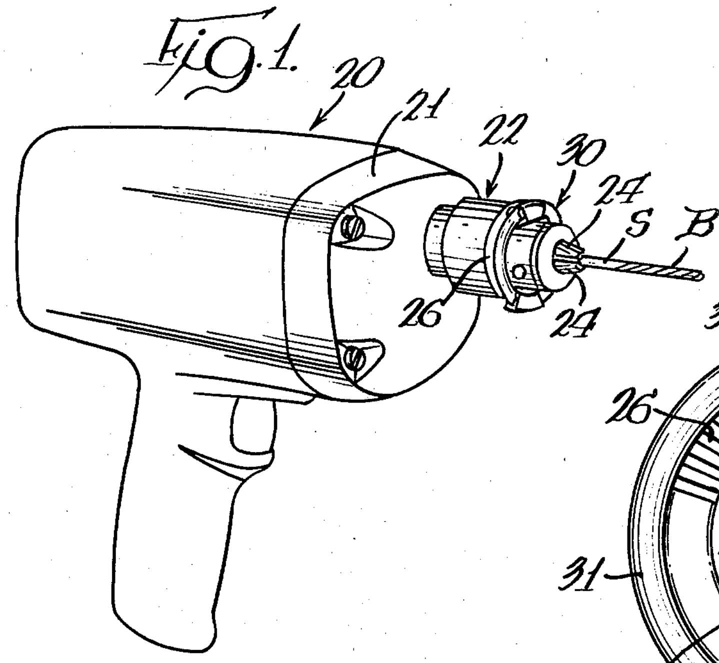
FIG. 1 is a perspective view of an electric drill having a chuck equipped with the preferred embodiment of the chuck operating means of the present invention.
Figure 2:
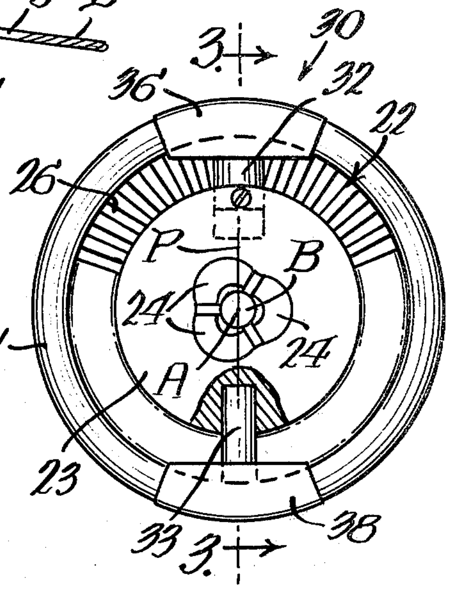
FIG. 2 is a front elevational view on an enlarged scale, partly in section, of the preferred embodiment of the chuck operating means in its normal position.
Figure 3:
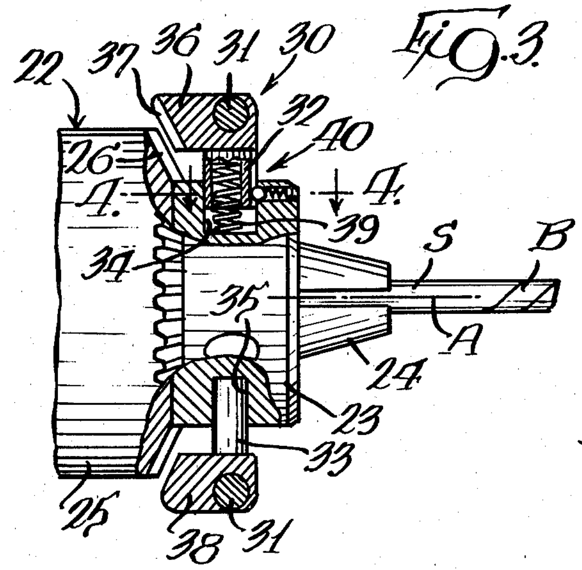
FIG. 3 is a side elevational view, partly in section as indicated along the line 3—3 of FIG. 2.
Figure 4:
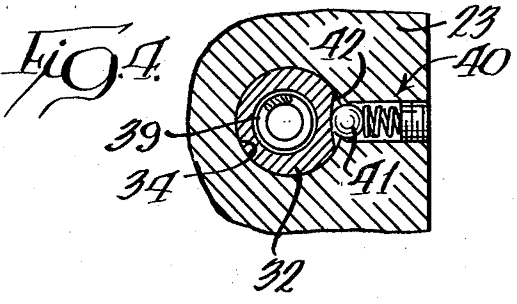
FIG. 4 is a fragmentary sectional view on an enlarged scale taken substantially as indicated along the line 4—4 of FIG. 3.
Figure 5:
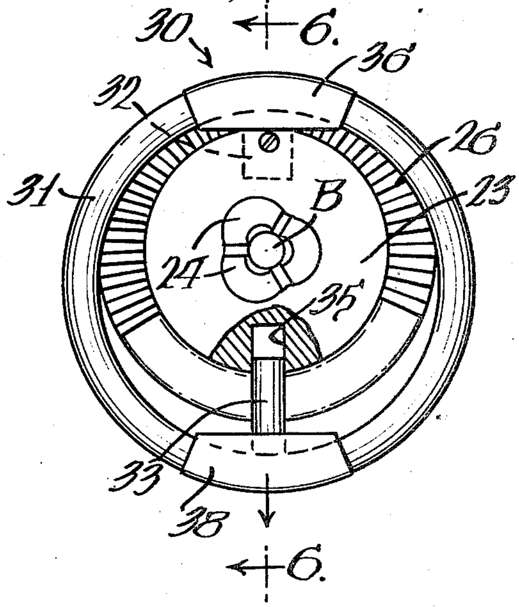
FIG. 5 is a view like FIG. 2, illustrating the chuck operating means in its operative position.
Figure 11:
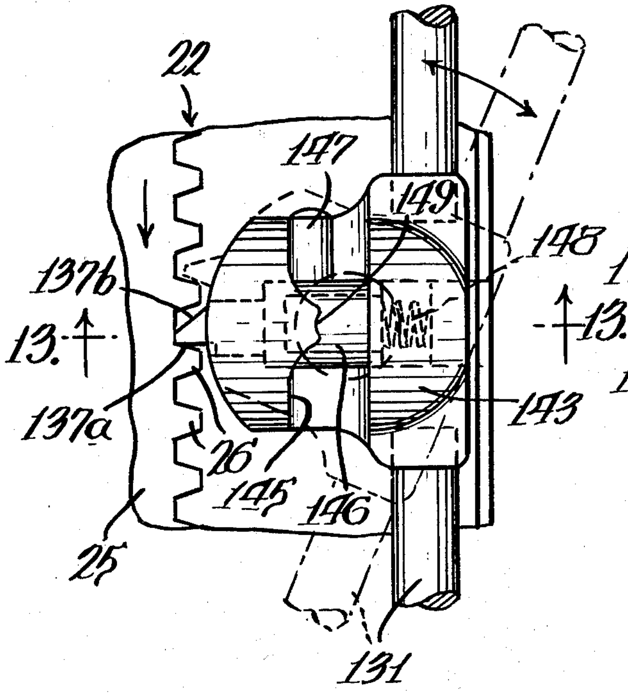
FIG. 11 is a fragmentary plan view, on an enlarged scale, of the alternative embodiment viewing FIG. 9 or FIG. 10 from above, and showing the chuck operating means in full lines in a normal position and in broken lines in a position to rotate the chuck ring gear in the direction indicated by the arrow.
Figure 12:
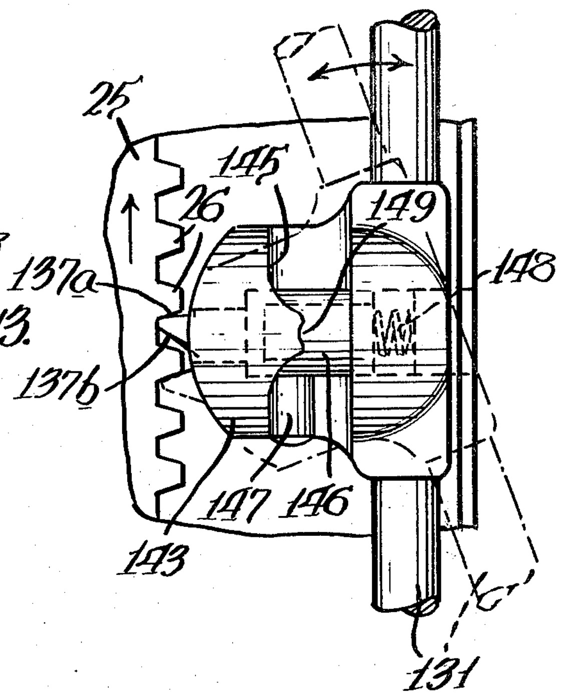
FIG. 12 is a view like FIG. 11 with the chuck operating means illustrated in broken lines in a position for moving the chuck ring gear in the direction indicated by the arrow.
Figure 13:
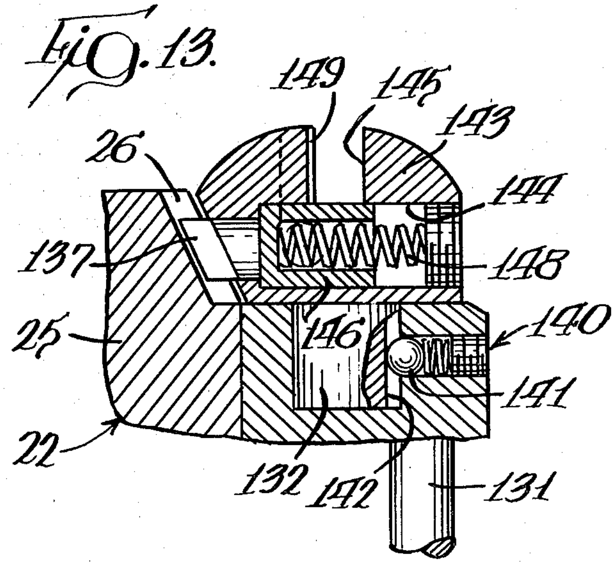
FIG. 13 is a fragmentary sectional view on an enlarged scale substantially as indicated along the line 13—13 of FIG. 11.

Referring now to the drawings, and referring first to FIG. 1, the invention is illustrated as applied to an electric drill, indicated generally at 20, which includes the usual housing 21 containing the drill motor, and a Jacobs chuck, indicated generally at 22, at the front of the housing. The chuck includes a collar 23, three radially movable drill shank clamping elements 24 which are carried in the collar, and a clamp operating ring gear 25 which is rotatably mounted upon the collar 23. Rotation of the ring gear 25 in one direction moves the chuck clamping elements 24 inwardly into clamping engagement with the shank S of a drill bit B, and rotation of the ring gear 25 in the opposite direction moves the clamping elements 24 radially outwardly to release the bit B. The ring gear 25 is provided with forwardly facing bevel gear teeth 26 which, in a conventional Jacobs chuck, are rotated with a key of the general type illustrated in U.S. Pat. No. 3,174,365.

Most of the rotation of the chuck ring gear 25 in either direction may be accomplished by direct digital manipulation; and it is only the final tightening of the clamping elements onto the drill bit shank S or the initial release of the clamping engagement which requires the use of a chuck key or other chuck operating means. It is this fact which makes it practical to use the chuck operating means of the present invention, a preferred embodiment of which is indicated generally at 30 in FIG. 1 and the other views which illustrate said preferred embodiment.

The chuck operating means 30 consists of an annular support 31 which has opposed pivot pins 32 and 33 pivotally supported, respectively, in axially aligned bores 34 and 35 in the chuck collar 23. The pivot axis P provided by the pivot pins 32 and 33 thus permits the annular support 31 to be rocked about said pivot axis P.

The annular support 31 occupies a normal position in which it is concentric with the chuck collar 23, and in that position an engaging means 36 of the chuck operating means 30 is disengaged from the teeth 26 of the chuck ring gear 25. The chuck gear engaging means 36 in the preferred embodiment of the invention constitutes a bevel gear segment having a plurality of teeth 37 which are engageable with the ring gear teeth 26. The engaging means 36 extends from the annular support 31 toward the ring gear 25 immediately adjacent the pivot pin 32, so that when the annular support 31 is rocked about the pivot axis P with the chuck engaging teeth 37 engaged with the ring gear teeth 26 the slight transverse arcuate movement of the engaging means 36 rotates the ring gear 25 sufficiently to release the bit B or clamp it, depending upon the direction in which the annular support 31 is rocked.

Because of the fact that the chuck 22 rotates when the tool is being driven, it is desirable that the center of mass of the chuck operating means 30 be effectively on the chuck axis A, and this is accomplished by providing the chuck operator with a counterweight 38 which is directly opposite the ring gear engaging means 36.

The pivot pin 32 for the annular support 31 is hollow, so that it may accommodate a compression spring 39 which biases the annular support toward its normal, concentric position in which the gear engaging means 36 is disengaged from the ring gear teeth 26. This permits the support 31 to be moved in a translatory fashion—i.e., along the pivot axis P, in order to engage the teeth 37 of the gear engaging means 36 with the ring gear teeth 26, whereupon rocking of the annular support 31 about the pivot axis P will cause the ring gear 25 to either clamp or release the bit B, as may be desired.

In order to assure that the annular support 31 normally occupies a plane which is perpendicular to the chuck axis A, stabilizing means is provided, indicated generally at 40, which may conveniently consist of a detent including a spring-pressed ball 41 which is in a bore in the chuck collar 23 and which seats in a recess 42 in the pivot pin 32.

The alternative embodiment of the invention, indicated generally at 130, is mounted upon the collar 23 of a Jacobs chuck 22 in substantially the same manner as is the preferred embodiment of the invention; but the second embodiment 130 has an annular support 131 which rocks on a pivot axis but is not bodily movable to engage and disengage a fixed ring gear engaging means. Instead, a ring gear engaging means, indicated generally at 136, is movably mounted on the annular support 131.

An enlarged boss 143 on the annular support 131 extends toward the ring gear 25 immediately adjacent a pivot pin 132, and in the boss 143 is a bore 144 which is parallel to the chuck axis A. A cross slot 145 cut into the boss 143 intersects the bore 144. The ring gear engaging means 136 consists of a pin 146 which is rotatably and slidably mounted in the bore 144 and has a single tooth 137 engageable with the ring gear teeth 26 of the chuck 22. A finger piece 147 on the pin 146 extends through the cross slot 145 so the pin 146 may be rotated 180° in the bore 144; and a compression spring 148 in the bottom of the bore 144 biases the pin 146 in a direction to normally maintain the tooth 137 in engagement with the ring gear teeth 26. The tooth 137 has a first face 137*a* which engages with a ring gear tooth 26 when the annular support 131 is rocked on its axis; and a second, inclined face 137*b* which may slide over the end of a ring gear tooth to cam the pin 146 endwise against the bias of the compression spring 148. Thus, the tooth 137 rotates the ring gear 25 when the annular support 131 is rocked in one direction, but ratchets when the support is rocked in the opposite direction. Furthermore, the directions of ring gear operation and ratcheting of the tooth 137 may be reversed by using the finger piece 147 to rotate the pin 146 180° in the bore 144, with the finger piece 147 moving from one extremity of the slot 145 to the opposite extremity.

In order that the tooth 137 may be disengaged from the ring gear teeth 26, a camming boss 149 is formed on one side of the slot 145. Accordingly, as the finger piece 147 approaches the midpoint of its movement in either direction in the slot 145 it rides onto the camming boss 149 to move the pin 146 endwise against the bias of the spring 148 and thereby disengage the tooth 137.

The alternative form of the invention is provided with a stabilizing detent 140 which performs the same function as the stabilizing detent 40 of the preferred form of the invention, and which also consists of a spring-pressed ball 141 in a recess 142 in the pivot pin 132.

The alternative embodiment of the invention also has a counterweight 138 which is diametrically opposite the boss 143 and which is large enough to counterbalance the boss and place the center of mass of the chuck operating means 130 effectively on the chuck axis A.

It is apparent that in both embodiments of the invention there is a ring gear engaging means permanently supported on the chuck collar 23 and movable on the collar to rotate the chuck ring gear 25 selectively in a forward or reverse direction, and that in each embodiment there is means permitting manual movement of the engaging means into and out of engagement with the chuck ring gear teeth 26. Furthermore, in each embodiment the ring gear engaging means is carried upon an annular support that includes pivot means by which the support is mounted on the chuck collar 23 for rocking movement about a pivot axis perpendicular to the chuck axis, and that it is this rocking movement which imparts the desired motion to the ring gear engaging means to rotate the ring gear 25. Further, each embodiment has its center of mass effectively on the axis of the chuck, and is provided with stabilizing means to maintain the annular support normally in a plane perpendicular to the chuck axis A while permitting it to be moved to rotate the ring gear 25.

The foregoing detailed description has been given for clearness of understanding only, and no unnecessary limitations should be understood therefrom as modifications will be obvious to those skilled in the art.

I claim:

1. In a hand tool having a chuck with tool gripping elements, a collar in which said elements are movably supported, and a ring gear rotatable on the collar, said ring gear having bevel teeth engageable by a toothed chuck operator to rotate said ring selectively in a forward or reverse direction to tighten or loosen the tool gripping elements on a tool spindle, an improved chuck operator comprising, in combination:

ring gear engaging means permanently supported on the chuck collar and movable on the collar to rotate the ring gear selectively in a forward or reverse direction;

and means permitting manual movement of the engaging means into and out of engagement with the ring gear teeth.

2. The combination of claim 1 which includes a support movably mounted on the chuck collar, the engaging means is carried upon said support, and the support and engaging means occupy a normal position with their center of mass effectively on the axis of the chuck.

3. The combination of claim 2 in which the support comprises a ring surrounding the chuck collar, and which includes stabilizing means on the support to maintain it normally in a plane perpendicular to the chuck axis while permitting it to be moved to rotate the ring gear.

4. The combination of claim 2 or 3 in which the engaging means is fixedly mounted on the support, the support is mounted for translatory movement on the chuck collar to move the engaging means into and out of engagement with the ring gear, the engaging means is disengaged in the normal position, and locating means holds said support in said normal position from which it may be manually moved to engage the engaging means with the ring gear.

5. The combination of claim 2 or 3 in which the engaging means comprises a pin mounted in a bore in the support for endwise movement and for rotation about an axis parallel to the chuck axis, a single tooth on the end of said pin adjacent the ring gear, said tooth having a first face which engages the ring gear teeth and a second face which may slide over said ring gear teeth to cam the pin endwise, and a finger piece on said pin for rotating it 180° to selectively position said first face for rotating the ring gear in either a forward or a reverse direction, and in which spring means urges said pin endwise toward the ring gear.

6. The combination of claim 5 which includes a camming boss on the support which is engaged by the finger piece midway of its 180° rotation to cam the pin endwise against the bias of the spring for disengaging the tooth from the ring gear.

7. In a hand tool having a chuck with tool gripping elements, a collar in which said elements are movably supported, and a ring gear rotatable on the collar, said ring gear having bevel teeth engageable by a toothed chuck operator to rotate said ring selectively in a forward or reverse direction to tighten or loosen the tool gripping elements on a tool spindle, an improved chuck operator comprising, in combination:

a support including pivot means by which said support is mounted on the chuck collar for rocking movement about a pivot axis perpendicular to the chuck axis;

ring gear engaging means carried on the support between said pivot axis and the ring gear teeth, said engaging means being selectively engageable with the ring gear teeth so that rocking the support causes the engaging means to rotate the ring gear;

and means permitting manual movement of the engaging means into and out of engagement with the ring gear teeth.

8. The combination of claim 7 in which the support comprises a ring surrounding the chuck collar and counterweight means on the ring opposite the engaging means to place the center of mass of the ring effectively on the chuck axis.

9. The combination of claim 7 or 8 which includes stabilizing means on the support to maintain it normally in a plane perpendicular to the chuck axis while permitting it to be manually rocked about its pivot axis to rotate the ring gear.

10. The combination of claim 9 in which the stabilizing means comprises resilient means interposed between the support and the chuck collar and tending to retain the support in said plane perpendicular to the chuck axis.

11. The combination of claim 10 in which the resilient means consists of a spring-pressed ball in the chuck collar and a recess in the support in which the ball seats.

12. The combination of claim 9 in which the engaging means comprises a toothed element fixedly mounted on the support, the support is movable along its pivot axis to move the engaging means into and out of engagement with the ring gear, and resilient means biases said support to a normal position in which the engaging means is disengaged and the center of mass of the support is effectively on the chuck axis.

13. The combination of claim 7 or 8 in which the engaging means comprises a toothed element fixedly mounted on the support, the support is movable along its pivot axis to move the engaging means into and out of engagement with the ring gear, and resilient means biases said support to a normal position in which the engaging means is disengaged and the center of mass of the support is effectively on the chuck axis.

14. The combination of claim 9 in which the engaging means comprises a pin mounted in a bore in the support for endwise movement and for rotation about an axis parallel to the chuck axis, a single tooth on the end of said pin adjacent the ring gear, said tooth having a first face which engages the ring gear teeth and a second face which may slide over said ring gear teeth to cam the pin endwise, and a finger piece on said pin for rotating it 180° to selectively position said first face for rotating the ring gear in either a forward or a reverse direction, and in which spring means urges said pin endwise toward the ring gear.

15. The combination of claim 14 which includes a camming boss on the support which is engaged by the finger piece midway of its 180° rotation to cam the pin endwise against the bias of the spring for disengaging the tooth from the ring gear.

16. The combination of claim 7 or 8 in which the engaging means comprises a pin mounted in a bore in the support for endwise movement and for rotation about an axis parallel to the chuck axis, a single tooth on the end of said pin adjacent the ring gear, said tooth having a first face which engages the ring gear teeth and a second face which may slide over said ring gear teeth to cam the pin endwise, and a finger piece on said pin for rotating it 180° to selectively position said first face for rotating the ring gear in either a forward or a reverse direction, and in which spring means urges said pin endwise toward the ring gear.

17. The combination of claim 16 which includes a camming boss on the support which is engaged by the finger piece midway of its 180° rotation to cam the pin endwise against the bias of the spring for disengaging the tooth from the ring gear.

* * * * *